Nov. 2, 1965  K. HÜLLER  3,215,012
MACHINE FOR MACHINING FORM RINGS ON ALL SIDES THEREOF
Filed June 26, 1963  10 Sheets-Sheet 1

Inventor:
Karl Hüller
By

Nov. 2, 1965   K. HÜLLER   3,215,012
MACHINE FOR MACHINING FORM RINGS ON ALL SIDES THEREOF
Filed June 26, 1963   10 Sheets-Sheet 2

Inventor:
Karl Hüller
By

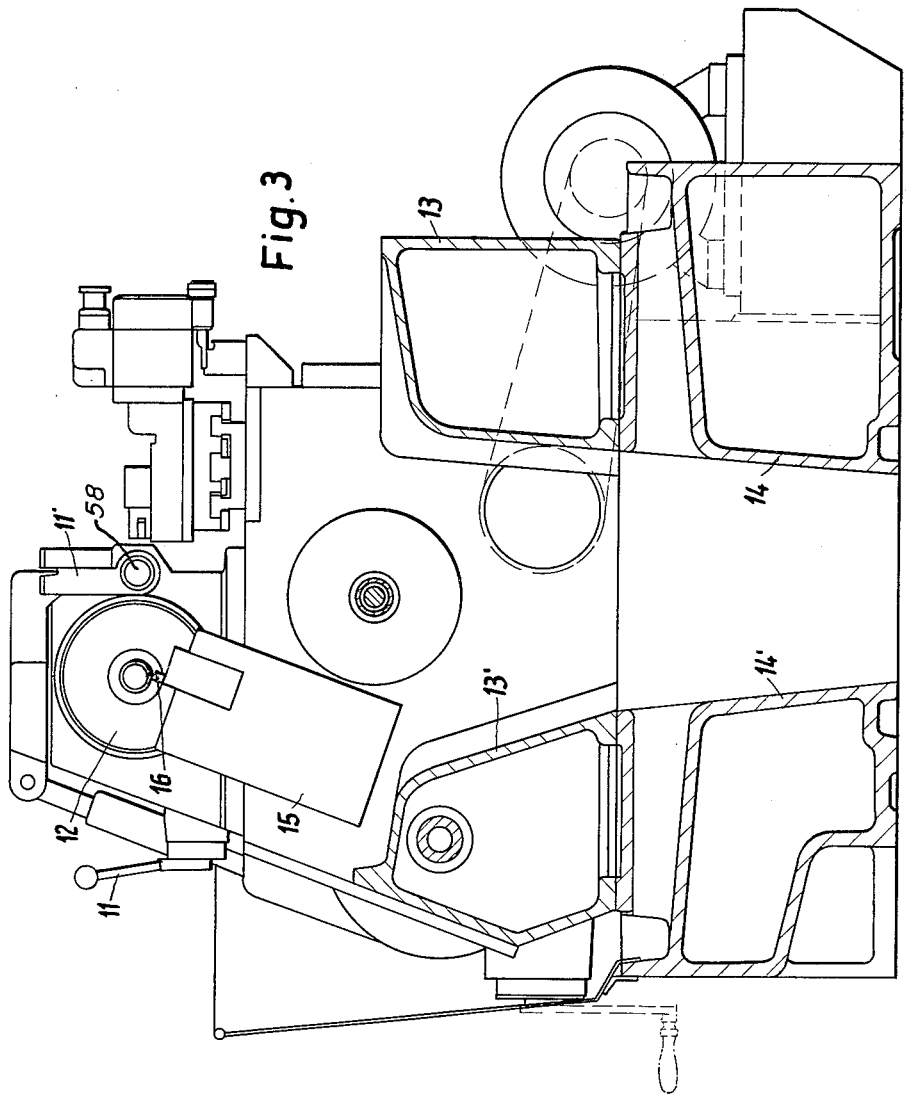

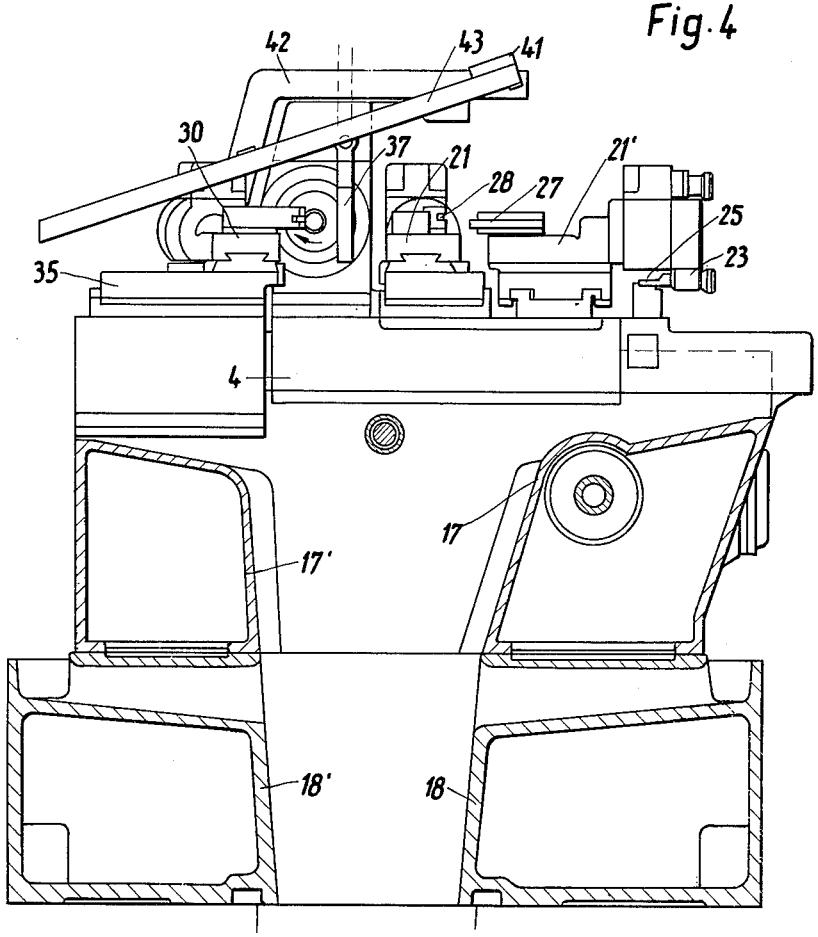

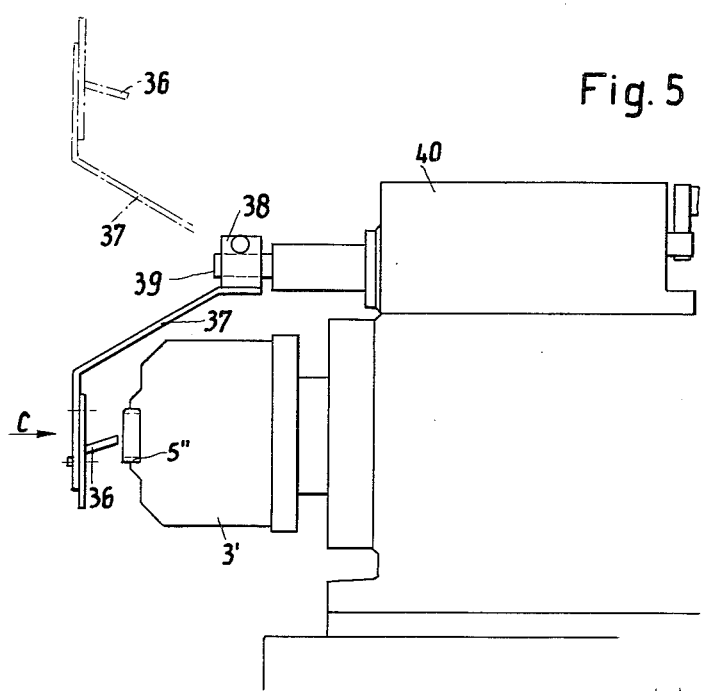
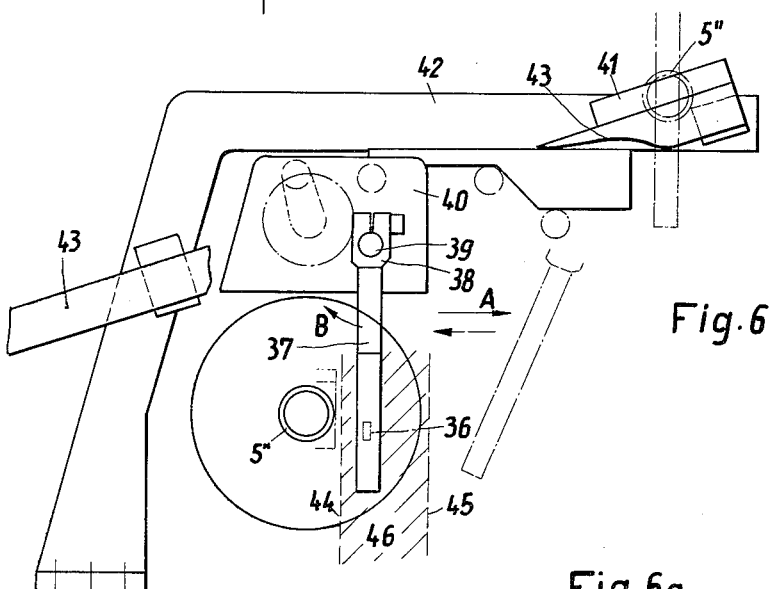
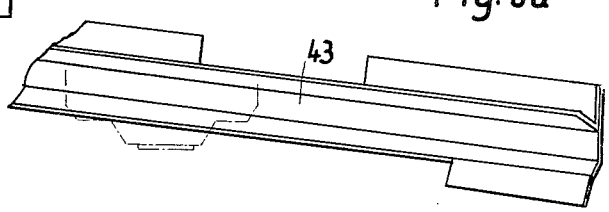

Nov. 2, 1965   K. HÜLLER   3,215,012
MACHINE FOR MACHINING FORM RINGS ON ALL SIDES THEREOF
Filed June 26, 1963   10 Sheets-Sheet 6

Inventor:
Karl Hüller
By
Walter Becker

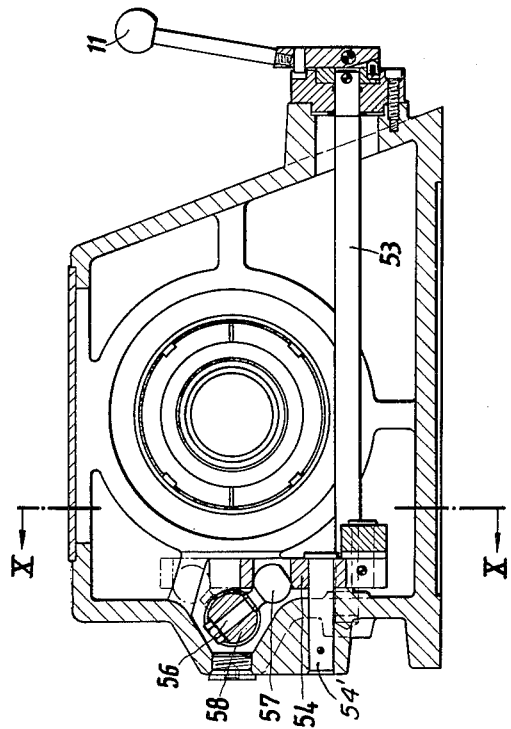
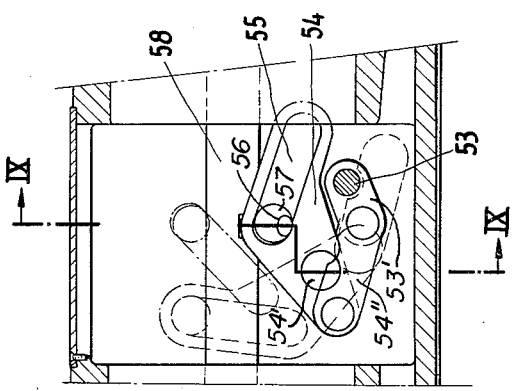

Nov. 2, 1965        K. HÜLLER        3,215,012
MACHINE FOR MACHINING FORM RINGS ON ALL SIDES THEREOF
Filed June 26, 1963        10 Sheets-Sheet 8
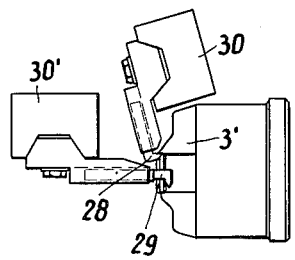
Fig. 11B
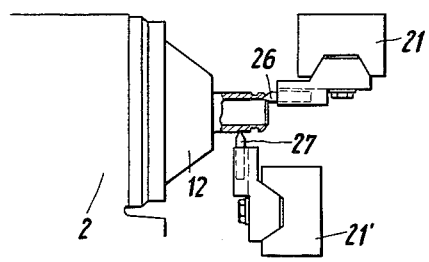
Fig. 11A
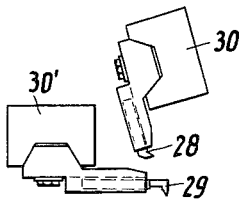
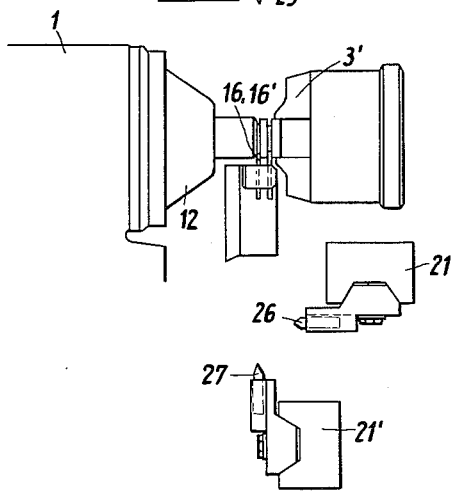
Fig. 12
Inventor:
Karl Hüller
By Nov. 2, 1965  K. HÜLLER  3,215,012
MACHINE FOR MACHINING FORM RINGS ON ALL SIDES THEREOF
Filed June 26, 1963  10 Sheets-Sheet 9
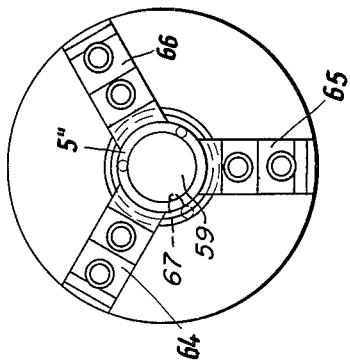
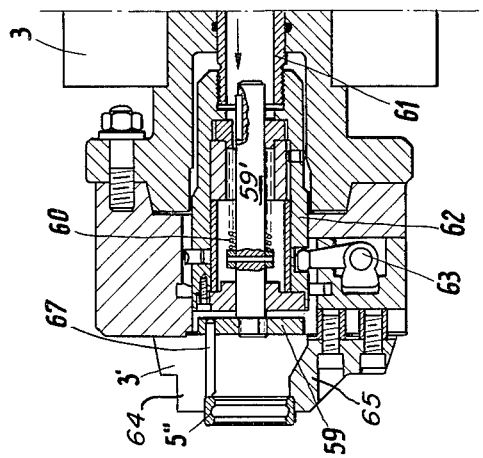
Inventor:
Karl Hüller
By

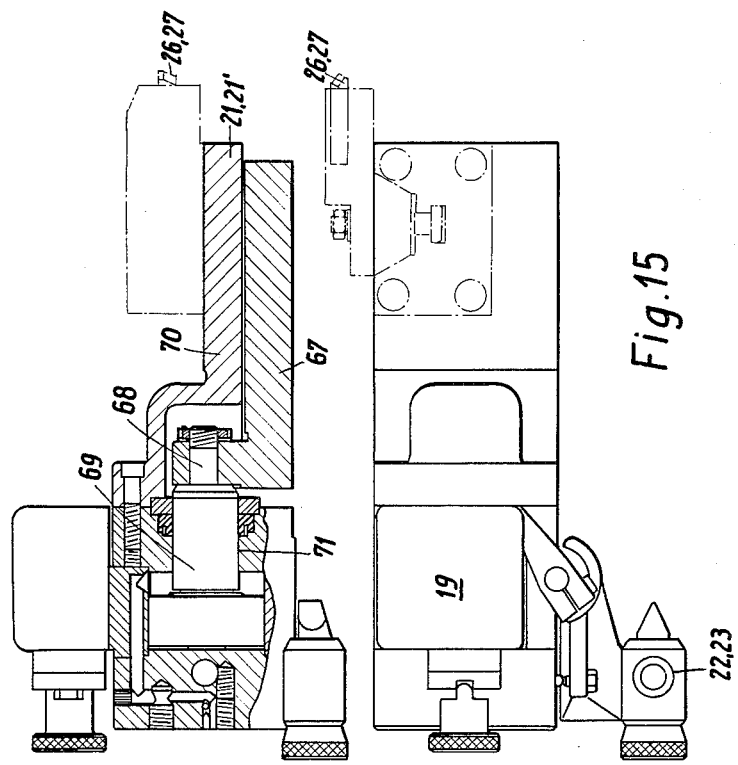
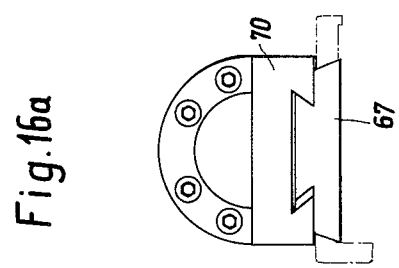

United States Patent Office 3,215,012
Patented Nov. 2, 1965

3,215,012
MACHINE FOR MACHINING FORM RINGS
ON ALL SIDES THEREOF
Karl Hüller, Ludwigsburg, Wurttemberg, Germany, assignor to Karl Hüller G.m.b.H., Ludwigsburg, Wurttemberg, Germany
Filed June 26, 1963, Ser. No. 292,196
Claims priority, application Germany, June 29, 1962,
H 46,220
6 Claims. (Cl. 82—14)

The present invention relates to a machine for machining on all sides form rings such as ball bearing rings, gears, and the like made from tubular or solid stock material, in which there is provided a first or main working spindle having associated therewith at least one second or auxiliary working spindle.

Special machines for machining by chip removal are known in which, in addition to a main working spindle, there are provided additional working spindles mounted, for instance, on transverse carriages in such a way that the various spindles either simultaneously or successively carry out different working operations. Heretofore known machines of the type involved have the drawback that the machining of inner and outer surfaces, for instance of ball bearing rings, had to be carried out on different machines. More specifically, with the heretofore known machines it was necessary, for instance, to drill on one machine, then to cut off the drilled piece, and subsequently to machine one side of the ring on said machine while the other side of the ring had to be machined on a separate machine. If, with such ball bearing rings it was additionally necessary to provide certain inner profiles, this operation had to be carried out on still another machine.

A further drawback of the above-mentioned heretofore known machines consists in that between the individual working operations, measuring controls had to be effected.

It is therefore an object of the present invention to provide a machine of the general type set forth above which will make it possible to produce form rings, particularly inner and outer race rings for ball bearings in a considerably more economical manner while eliminating the transfer of the work piece from one machine to another machine.

It is another object of this invention to provide a machine as set forth in the preceding paragraph, which will operate fully automatically and permit on one and the same machine the machining of all inner and outer surfaces including the cutting off of the work piece from stock material while eliminating intermediate checking operations.

It is another object of this invention to provide a machine as set forth in the preceding paragraphs, in which some of the machining operations may overlap each other.

It is a further object of this invention to provide a machine for machining form rings from all sides, which is provided with means permitting the forming and machining in conformity with templates, or the like.

A still further object of this invention consists in the provision of a machine of the type set forth above, which will automatically eject the finished work piece.

A further object of this invention consists in the provision of a machine as set forth in the preceding paragraphs, which is characterized by a particularly compact and simple construction.

These and other objects and advantages of the invention will appear more clearly from the following specification in connection with the accompanying drawings, in which:

FIGURE 1 diagrammatically illustrates a side view of a two-spindle machine according to the present invention;

FIGURE 3 represents a section taken along the line III—III of FIGURE 1;

FIGURE 4 is a section taken along the line IV—IV of FIGURE 1;

FIGURE 5 is a side view of a discharging arrangement employed in connection with the present invention;

FIGURE 6 is a view of FIGURE 5 seen in the direction of the arrow C.

Figure 7:
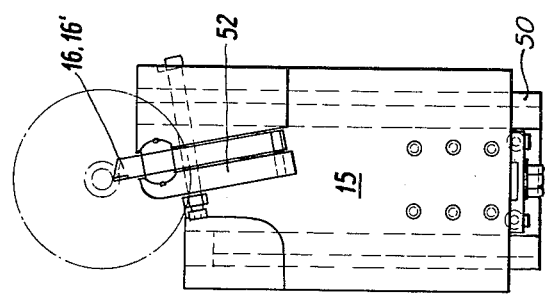

FIGURE 6a has a view looking down on top of the discharge chute;

FIGURE 7 is a top view of a cutting-off carriage for use in connection with the present invention.

Figure 8:
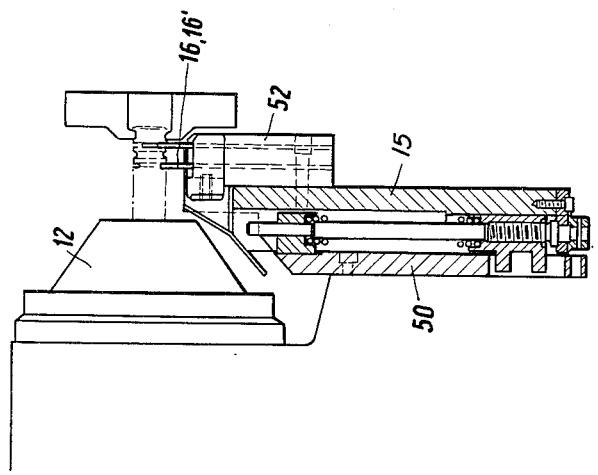

FIGURE 8 is a longitudinal section through FIG. 7.

FIGURE 9 is a section along the line IX—IX of FIGURE 10 through the main head stock.

FIGURE 10 represents a section along the line X—X of FIGURE 9.

FIGURES 11A and 11B illustrate the spindle at different working operations.

FIGURE 12 shows the spindle during the pre-cutting and cutting-off operation.

FIGURE 13 is a section through the chuck of the counter-spindle.

FIGURE 14 is an end view of FIGURE 13.

FIGURE 15 is a top view of the copying unit.

FIGURE 16 is a longitudinal section of FIGURE 15.

FIGURE 16A is an end view of FIGURE 16 as seen from the left-hand side thereof (with regard to the drawing).

According to the present invention, there is provided a first spindle through which the stock material is fed for completely machining the outside and one end face of the work piece while means are provided for cutting off the thus machined work piece. The machine according to the present invention furthermore comprises a second working spindle movable relative to said first working spindle for receiving the work piece machined on said first working spindle and for finish machining the work piece.

According to a further feature of the present invention, the machine is provided with copying devices adapted to control the machining on said working spindles in conformity with templates, or the like.

Referring now to the drawings in detail, the machine illustrated therein comprises a frame 14, 14′, 18, 18′ having mounted thereon a bed 13, 13′ which in its turn supports a head stock 2 having rotataby journalled therein a first or main working spindle 1. This main spindle is hollow for receiving the stock material 5. The tubular or rod-shaped stock material 5 is, through a guiding pipe 6 supported by supporting means 7 introduced into the hollow main working spindle 1. Associated with and arranged at the loading side of spindle 1 is an automatic feeding device 8 which is equipped with a clamping device, for instance, a chuck 9. The clamping device is adapted to be opened by a manually operable lever 10. An adjustable manually operable lever 11 is adapted to adjust an abutment 11′ for the stock material 5 (see FIG. 3). At the front end of the main spindle 1 there is provided a clamping head 12 with clamping jaws.

FIGURES 3, 7 and 8 show a cutting off carriage 15 with cutters 16, 16′ arranged at the end face of the main spindle head 2.

The aforementioned abutment 11′ is operated by the mechanism shown in FIGURES 9 and 10. Abutment 11′, not shown in these figures, is mounted on a rock shaft 58. Shaft 58 has an arm 56 fixed thereto with a ball end 57. Ball end 57 is disposed in a slot 55 in a lever 54 supported on pivot pin 54'. A link 54" is pivotally connected between lever 54 and an arm 53' fixed to shaft 53. Rotation of shaft 53 by lever 11 will thus cause shaft 58 to rock and move abutment 11' between its effective and ineffective positions.

FIGURES 7 and 8 also show that carriage 15 is slidably carried on a base member 50 and that carriage 15 is provided with support means 52 in which tools 16, 16' are mounted.

As will be seen from the above, the main spindle 1 with clamping head 12 and clamping jaws with chuck 9 and feeding device 8 as well as with the cutting-off carriage 15 with cutter 16 form one structural unit mounted on a single frame 14, 14' having mounted at the end face thereof a transverse carriage with counter spindle head and copying unit, as will presently be described. Parallel to the main working spindle 1 supported by spindle head 2 there is provided a counter spindle head 3 which is mounted on a transverse carriage 4 displaceably arranged in a direction perpendicular to the direction of the longitudinal axis of the main spindle 1. The transverse carriage 4 is supported by transverse supports 17, 17' which are mounted on the frame 18, 18'. The bed 13, 13' and the support 17, 17' as well as the frame 14, 14' and 18, 18' form, with the complete machine, a single structural unit. The counter spindle head 3 is on transverse carriage 4 movable parallel to itself in a direction perpendicular to the longitudinal axis of the main spindle 1 (see FIG. 2). At both sides of spindle head 3 there are respectively arranged copying units 19, 20 more clearly shown in FIGS. 15 and 16.

Preferably, a first copying unit with template carriages and feelers is provided on one side of the counter spindle head 3, while a corresponding second copying unit with carriage, templates and feelers is arranged on the oppositely located side of the counter spindle head 3. Such an arrangement will result in a particularly simple, compact structure of the device.

In this connection, it is advantageous to hydraulically operatively connect the first copying unit with a pointed tool for machining the outer surface of the work piece, and with a second pointed tool for machining the end face of the work piece. The second copying unit may hydraulically be operatively connected with a pointed tool for operating the inner surface of the work piece and with a further pointed tool for operating the remaining outer surface of the work piece.

More specifically with regard to the drawing, the copying unit 19 comprises copying carriages 21, 21'. The feelers 22, 23 of the copying unit 19 sense the templates 24, 25 of this copying unit and transfer the received impulses hydraulically to the machining tools, viz. the pointed tools 26 and 27. Tool 26 machines the end face of the annular work piece 5', whereas pointed tool 27 machines the outside of the work piece. The said second copying unit 20 comprises carriages 30, 30' and templates 31, 32 and feelers 33, 34 associated therewith. The feelers 33, 34 are, through hydraulic connecting conduits operatively connected to machining tools 28, 29. Tool 28 machines the remaining outer contour of ring 5" previously machined by the tools 26, 27. Tool 29 machines the inner surface of the cut-off and partially finished machined ring 5" to its finished dimensions.

FIGURES 15, 16 and 16a will show that the carriage means 21, 21' are slidable on a base means 67. Base means 67 is connected by shaft 68 to a piston 69 moveable through a bore 71 in the end wall of a movable cylinder member. Carriage means 21, 21' are connected by portions 70 thereof with the aforementioned cylinder.

Figure 1:
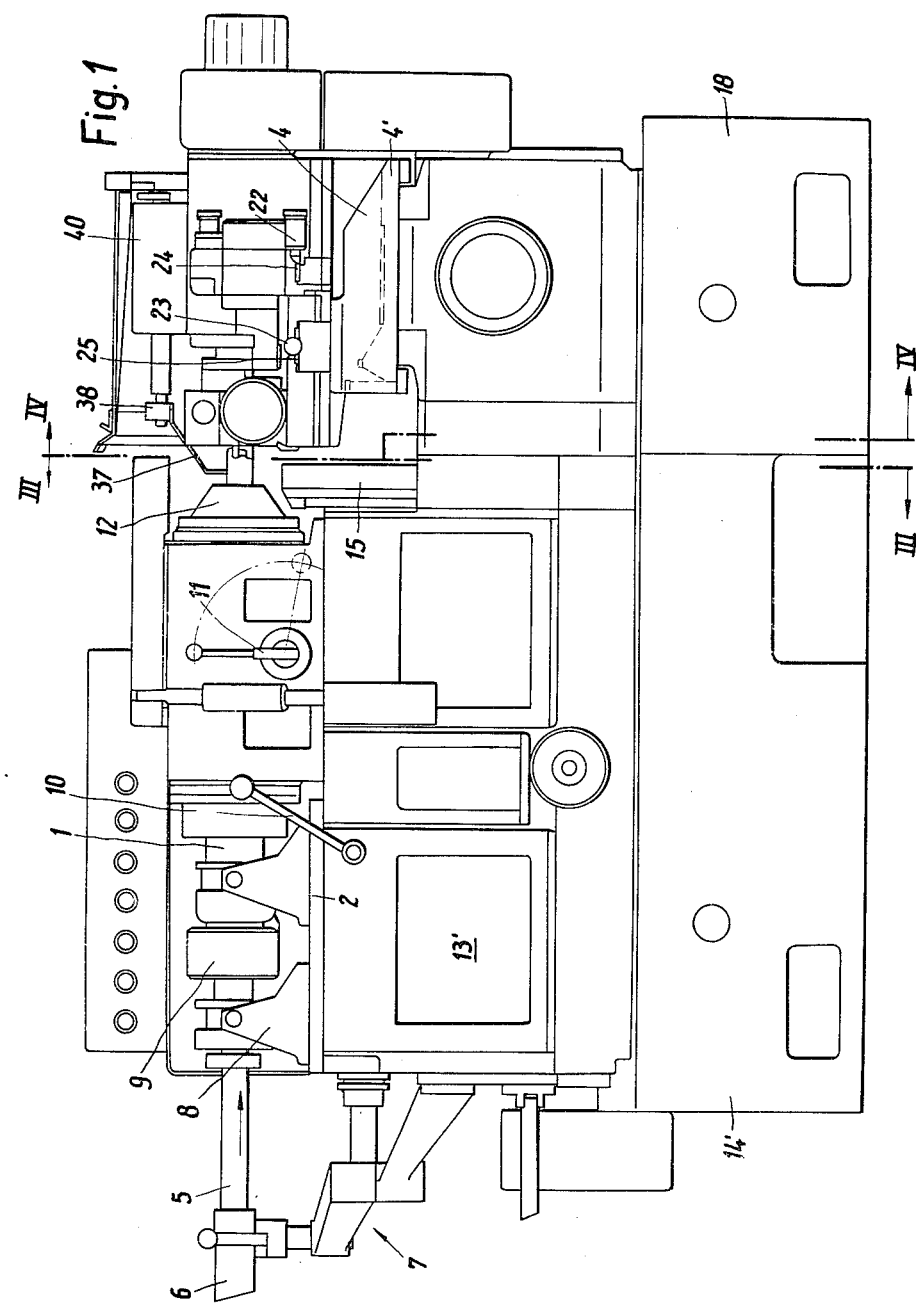
Figure 2:
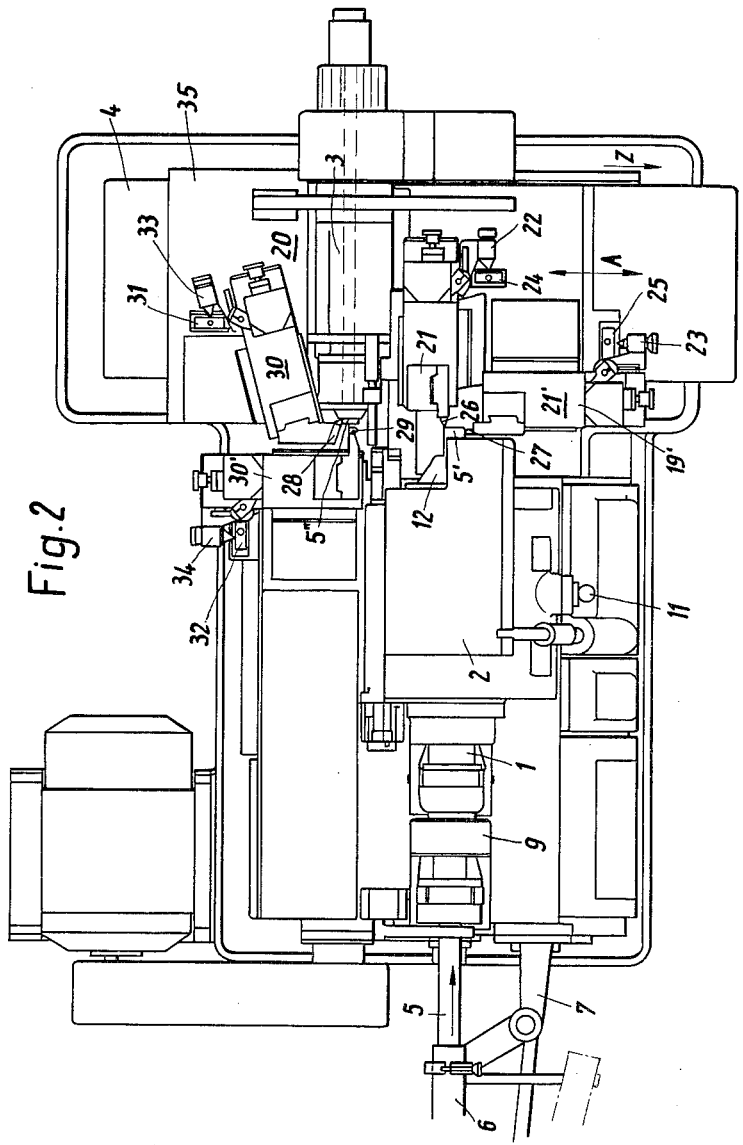
FIGURE 2 is a top view of the machine shown in FIGURE 1 with the discharging device removed.

As will be evident from FIG. 2, the transverse carriage 4 is partially covered by a bridge 35. This transverse carriage 4 is displaceable on a guiding track 4' in a direction transverse to the axis of the main working spindle 1 while counter spindle head 3 and copying unit 19 with the copying carriages 21, 21' and the withdrawal device likewise move with this transverse movement of the transverse carriage.

Thus, as will be evident from the above, each machining tool 26, 27 and 28, 29 has respectively associated therewith a copying unit with template, feeler and carriage. The copying unit for tool 26 comprises carriage 21, template 24 and feeler 22, whereas the copying unit for the circumference machining tool 27 comprises carriage 21', feeler 23, and template 25. The copying units for the outer surface machining tool 28 comprise carriage 30 with feeler 33 and template 31. Tool 29 for machining the inner surface of the ring 5" comprises carriage 30' with template 32 and feeler 34.

According to a further development of the present invention, a particularly simple withdrawing device is provided according to which the clamping chuck 3' (also see FIGS. 13 and 14) of the counter spindle head has associated therewith a work piece ejector and a cam-controlled tiltable receiving arm or rod. The work piece ejector may consist of ordinary springs arranged within the clamping chuck. The annular work piece receiving arm or rod may, according to a particularly simple construction, be designed as a normally upwardly directed arm the free end of which, when in work piece receiving position, is located in front of the center of the annular work piece to be ejected. This arm is movable into a position in which it points downwardly to thereby release the picked-up work piece.

FIGURES 13 and 14 show more in detail the arrangement of clamping chuck 3' of the counter spindle head. These views will show that chuck 3' includes radially movable clamping jaws 64, 65 and 66 which clamp workpiece 5". Also, to be seen is an ejector plate 59 which carries ejector pins 67 extending axially toward a workpiece in the chuck. Plate 59 is mounted on the end of a shaft 59' which extends axially through a sleeve 62 which at its rear end is threadedly connected to a tubular member 61. Bellcrank means at 63 operatively engages sleeve 62. A spring 60 inside sleeve 62 bears against shaft 59' urging it in the outward direction of the chuck.

More specifically, FIGS. 5 and 6 illustrate the withdrawing device on an enlarged scale. When the annular work piece 5" shown in FIG. 2 has been finish-machined, the clamping chuck of the counter spindle head 3 opens up automatically. This clamping chuck 3' is equipped with three resilient noses for automatically ejecting the finished work piece 5" when said clamping chuck opens up.

FIG. 5 shows that immediately at the instant of ejecting work piece 5" there will be located ahead of the latter a rod 36 connected to a cam-controlled tiltable arm 37. This arm 37 with rod 36 is mounted on a chuck 38 which is fixedly mounted on shaft 39 adapted to be driven by a discharging transmission 40. After the work piece 5" has been received by rod 36, shaft 39 is controlled automatically so as to turn by 180° into the dot-dash position illustrated in FIG. 5, so that rod 36 will point downwardly. The corresponding position is shown in FIG. 6 in dot-dash lines. When rod 36 is in this position, work piece 5" drops into a funnel 41 connected to the support 42. From funnel 41 the work piece drops into a chute 43. The withdrawing device is movable together with the counter spindle head 3.

FIG. 6 shows in solid lines work piece 5" clamped into the chuck in its left-hand end position while the chuck together with the counter spindle and work piece 5" is about to carry out a movement in the direction of the arrow A. Within the area shown in FIG. 6 shaded and confined by the vertical dash lines 44, 45, the chuck opens and the work piece 5" is automatically ejected onto the arm 36 of the tiltable arm 37. During the further movement of the counter spindle head 3, tiltable arm 37 begins to turn in the direction of the arrow B and eventually moves into the dot-dash position shown on the right-hand side of FIG. 6. In this vertical position of arm 37 in which arm 36, as indicated in dot-dash lines in FIG. 5 points downwardly, the work piece is automatically released so that it can drop into the chute 41.

Chute 41 preferably is inclined with regard to the horizontal so that the further movement of the work piece to a desired storage place can be effected by gravity.

The machine according to the present invention operates in the following manner: The tubular stock material 5 is by means of the above-described clamping unit with clamping chuck 9 moved into the hollow spindle 1 and is clamped in clamping head 12 after the length of the stock material protruding beyond said clamping head 12 has been properly adjusted. The pointed tools 26, 27 first machine the end face and the outer circumferential surface of the tube end freely protruding from clamping head 12. These tools 26, 27 are controlled by means of the hydraulic feelers 22, 23 with templates 24, 25, respectively. After this machining operation, the tools 26 and 27 are withdrawn, and the counter spindle head 3 is displaced in transverse direction in the direction of the arrow Z of FIG. 2 until the counter spindle head 3 is located in axial alignment with the main working spindle. In this position chuck 3' of the counter spindle head 3 is able to grasp and chuck the already machined end portion of tube 5 when said counter spindle head 3 rotates synchronously with the main working spindle 1. After the machined end of tube 5 has been clamped fast by the counter spindle head 3, the cutting-off carriage 15 is moved into working position so that the cutting-off tool 16 will be able to cut off a ring 5. from tube 5. After the cut-off operation has been completed, the counter spindle head 3 moves in opposite direction to arrow Z back to its starting position while the advance of tube 5 is started, thereby moving the stock material into a new working position for tools 26, 27. When the counter spindle head 3 has reached its end position, the starting position is re-established. The tools 26, 27 now again machine the end surface and one portion of the outer contour of the now freely protruding end 5 of the tube stock material, while at the same time the second copying unit on the other side of the counter spindle head 3 will, by means of tool 28, machine the remaining outer surface and the not-yet-machined inner surface of the ring by tool 29. These machining operations are controlled by the copying units of said second copying device 20.

The machining operations are timed with regard to each other in such a way that the machining operations of the ring on both sides thereof can be effected in both end positions of the counter spindle head. After completion of the machining by tools 28, 29 the counter spindle head 3 is displaced again in the direction of the arrow Z. During this displacing operation, the tilting arm 37 of the withdrawing device with rod or arm 36 is moved into the withdrawing position according to FIG. 5, so that when the chuck opens within the area 46 (FIG. 6), the finished machined work piece 5" can move onto arm 36 and is moved out of the chip and oil range by rotation of spindle 39 and tilting arm 37, as a result of which the tilting arm 37 is turned by 180° and arm 36 points downwardly. The work piece then drops into the chute 41 and through a further chute 43 may pass to the desired storage place.

The invention has been described in connection with the machining of tubular material. If rod material is to be machined, the hollow shaft of the counter spindle head 3 will be provided with a drilling device 3b which, simultaneously with the cutting-off operation, drills the rod material. However, in this connection, attention is to be paid to the fact that the drilling operation must be completed prior to the complete cutting off of the cutting-off tool. Such drilling device is preferably equipped with a chip-breaking device in such a way that during the operation, no coherent chip of any material length can be formed.

It is, of course, to be understood that the present invention is, by no means, limited to the particular constructions shown in the drawings, but also comprises any modifications within the scope of the appended claims.

What I claim is:

1. A machine for producing ring members machined on all sides thereof from tubular stock material, which includes: a bed, a first machining unit including hollow main spindle means and being mounted on said bed for receiving and clamping therein stock material to be machined, carriage means movably supported by said bed and movable in a direction transverse to the axis of rotation of said main spindle means, a second machining unit including counter spindle means and being carried by said carriage means and movable by the latter from a first position in which the axis of said counter spindle means is offset with regard to the axis of said main spindle means into a second position in which the axis of said counter spindle means is in axial alignment with the axis of said main spindle means, said counter spindle means also being movable from said second position into said first position, means associated with said second machining unit for chucking a work piece in said second machining unit while it is still being supported by said first machining unit, and first and second copying units, each of said copying units comprising feeler means for cooperation with template means and also comprising movable tool supporting means controlled by said feeler means, one of said copying units being arranged on one side of said counter spindle means and being operable for controlling the machining of workpieces in said main spindle means and the other one of said copying units being arranged on the other side of said counter spindle means and being operable for controlling the machining of workpieces in said counter spindle means when said counter spindle means is in its said first position, said one copying unit being mounted on said carriage for movement together with said counter spindle means so as to be brought into working position when said counter spindle means moves to its said first position.

2. A machine according to claim 1, in which each of said copying units includes two tool supporting means movable at a right angle with regard ot each other, and hydraulic transmission means interposed between said tool supporting means and said feeler means for conveying the movement of the latter to said tool supporting means for machining end faces and axial surfaces of a blank in said spindle means.

3. A machine for producing ring members machined on all sides thereof from tubular stock material, which includes: a bed, a first machining unit including hollow main spindle means and being mounted on said bed for receiving and clamping therein stock material to be machined, carriage means movably supported by said bed and movable in a direction transverse to the axis of rotation of said main spindle means, a second machining unit including counter spindle means and being carried by said carriage means and movable by the latter from a first position in which the axis of said counter spindle means is offset with regard to the axis of said main spindle means into a second position in which the axis of said counter spindle means is in axial alignment with the axis of said main spindle means, said counter spindle means also being movable from said second position into said first position, means associated with said second machining unit for chucking a work piece in said second machining unit while it is still being supported by said first machining unit, first tool means for machining a workpiece in said main spindle, second tool means for machining a workpiece in said counter spindle means when the latter is in its said first position, and work piece receiving and discharging means supported by said carriage means and movable therewith for receiving the finished work piece from said second machining unit and for discharging same, said first tool means being supported together with said counter spindle means and moving into working position when said counter spindle means moves to its said first position, said second tool means being stationarily mounted and becoming effective when said counter spindle means moves to its said first position.

4. A machine for producing ring members machined on all sides thereof from stock material, which includes: a bed, a first machining unit including hollow main spindle means and being mounted on said bed for receiving and clamping therein stock material to be machined, carriage means movably supported by said bed and movable in a direction transverse to the axis of rotation of said main spindle means, a second machining unit including counter spindle means and being carried by said carriage means and movable by the latter from a first position in which the axis of said counter spindle means is offset with regard to the axis of said main spindle means into a second position in which the axis of said counter spindle means is in axial alignment with the axis of said main spindle means, said counter spindle means also being movable from said second poistion into said first position, means associated with said second machining unit for chucking a work piece in said second machining unit while it is still being supported by said first machining unit, work piece ejecting means associated with said counter spindle means for ejecting a finished work piece, work piece receiving and discharging means supported by said carriage means and movable from a work piece receiving station to a work piece discharging station and vice versa, and cam means operatively connected to said work piece receiving and discharging means for controlling the movement of the latter for receiving and discharging a workpiece during movement of said counter spindle means from its said first position to its said second position, said first tool means being supported together with said counter spindle means and moving into working position when said counter spindle means moves to its said first position, said second tool means being stationarily mounted and becoming effective when said counter spindle means moves to its said first position.

5. A machine for producing ring members machined on all sides thereof from stock material, which includes: a bed, a first machining unit including hollow main spindle means and being mounted on said bed for receiving and clamping therein stock material to be machined, carriage means movably supported by said bed and movable in a direction transverse to the axis of rotation of said main spindle means, a second machining unit including counter spindle means and being carried by said carriage means and movable by the latter from a first position in which the axis of said counter spindle means is offset with regard to the axis of said main spindle means into a second position in which the axis of said counter spindle means is in axial alignment with the axis of said main spindle means, said counter spindle means also being movable from said second position into said first position, means associated with said second machining unit for chucking a work piece in said second machining unit while it is still being supported by said first machining unit, work piece receiving and discharging means supported by said carriage means and movable from a work piece receiving position to a work piece discharging position and vice versa, and actuating means including a rotatable shaft drivingly connected to said work piece receiving and discharging means for operating the same for receiving and discharging a workpiece during movement of said counter spindle means from its said first position to its said second position, said first tool means being supported together with said counter spindle means and moving into working position when said counter spindle means moves to its said first position, said second tool means being stationarily mounted and becoming effective when said counter spindle means moves to its said first position.

6. A machine according to claim 1, in which said counter spindle means includes a hollow spindle section for receiving a boring tool.

References Cited by the Examiner
UNITED STATES PATENTS
2,473,306    6/49    Schreiber _____ 82—2.5

FOREIGN PATENTS
1,056,787    3/54    France.

WILLIAM W. DYER, JR., *Primary Examiner.*

DONALD R. SCHRAN, LEON PEAR, *Examiners.*